(12) United States Patent
An et al.

(10) Patent No.: US 12,714,952 B2
(45) Date of Patent: Aug. 25, 2026

(54) GAS-LIQUID SEPARATION DEVICE

(71) Applicants: Hyundai Motor Company, Seoul (KR); Kia Corporation, Seoul (KR); Research & Business Foundation Sungkyunkwan University, Suwon-si (KR)

(72) Inventors: Ho Chan An, Hwaseong-si (KR); Yeon Ho Kim, Seoul (KR); Jae Wan Kim, Hwaseong-si (KR); Ho Young Jeong, Dalseo-gu (KR); Yeong Jun Kim, Yeonsu-gu (KR); Jae Yeon Kim, Hwaseong-si (KR); Man Hee Park, Suwon-si (KR); Tae Sung Kim, Seoul (KR); Yeong Kwang Cho, Osan-si (KR); Jun Ho Yun, Gumi-si (KR)

(73) Assignees: Hyundai Motor Company, Seoul (KR); Kia Corporation, Seoul (KR); Research & Business Foundation Sungkyunkwan University, Suwon-si (KR)

( * ) Notice: Subject to any disclaimer, the term of this patent is extended or adjusted under 35 U.S.C. 154(b) by 429 days.

(21) Appl. No.: 18/083,104

(22) Filed: Dec. 16, 2022

(65) Prior Publication Data

US 2023/0372840 A1 Nov. 23, 2023

(30) Foreign Application Priority Data

May 17, 2022 (KR) .......................... 1020220059924

(51) Int. Cl.
*B04C 5/04* (2006.01)
*B01D 19/00* (2006.01)
(Continued)

(52) U.S. Cl.
CPC ............ *B01D 19/0057* (2013.01); *B04C 5/04* (2013.01); *B04C 5/081* (2013.01); *B04C 5/103* (2013.01); *B04C 5/12* (2013.01)

(58) Field of Classification Search
CPC .. B01D 19/0057; B01D 19/0052; B04C 5/04; B04C 5/081; B04C 5/103; B04C 5/12; F01P 11/028; F01P 11/029
See application file for complete search history.

(56) References Cited

U.S. PATENT DOCUMENTS

| | | | | |
|---|---|---|---|---|
| 447,333 A * | 3/1891 | Kutsche | B04C 5/28 | 181/231 |
| 3,049,343 A * | 8/1962 | Helming | C04B 7/432 | 55/444 |

(Continued)

FOREIGN PATENT DOCUMENTS

| | | |
|---|---|---|
| CN | 108697958 A | 10/2018 |
| CN | 109895659 A | 6/2019 |

(Continued)

*Primary Examiner* — Dung H Bui
(74) *Attorney, Agent, or Firm* — Fish & Richardson P.C.

(57) ABSTRACT

The disclosed gas-liquid separation device separates, from a liquid, gas mixed in the liquid. The gas-liquid separation device includes a body configured to allow mixed fluid to be introduced into a longitudinally central portion thereof, and to have a cylindrical structure having an inner diameter gradually reduced as the body extends from the central portion to opposite ends thereof, a pair of gas discharge pipes respectively provided at the opposite ends of the body and configured to discharge, to an exterior of the body, gas separated from the mixed fluid in an interior of the body, and a pair of liquid discharge pipes respectively provided at the opposite ends of the body and configured to discharge, to the exterior of the body, the mixed fluid from which the gas has been separated.

15 Claims, 9 Drawing Sheets

(51) Int. Cl.

*B04C 5/081* (2006.01)
*B04C 5/103* (2006.01)
*B04C 5/12* (2006.01)

(56) References Cited

U.S. PATENT DOCUMENTS 3,505,703 A * 4/1970 Miller .................. E01H 1/0845 55/459.3
4,205,965 A * 6/1980 Bielefeldt ................ B04C 7/00 95/271
4,265,640 A * 5/1981 Bielefeldt ............. B01D 45/12 95/271
4,271,010 A * 6/1981 Guarascio ................ B04C 5/04 210/512.2
4,276,068 A * 6/1981 Laussermair ............ B04B 9/06 55/348
4,473,478 A * 9/1984 Chivrall ............ B01D 19/0057 96/208
4,783,254 A * 11/1988 Shah ........................ B03B 5/34 209/724
4,859,347 A * 8/1989 Simon .................... B04C 11/00 210/512.1
4,995,989 A * 2/1991 Carroll ..................... B04C 3/06 269/211
5,427,685 A * 6/1995 Thorley ................ B01D 45/12 210/512.1
5,843,211 A * 12/1998 Bielefeldt ................ B04C 5/04 95/271
6,110,242 A * 8/2000 Young ................... B01D 50/20 406/173
6,572,668 B1 * 6/2003 An ....................... A47L 9/1683 55/459.1
7,291,190 B2 * 11/2007 Dummelow .......... A47L 9/1641 55/459.1
8,186,006 B2 * 5/2012 Hyun ..................... A47L 9/165 15/348
2009/0010721 A1 * 1/2009 Albrecht ............... B01D 45/12 406/173
2009/0178376 A1 * 7/2009 Ha ....................... A47L 9/1683 55/344
2009/0293224 A1 * 12/2009 Hyun ..................... A47L 9/165 15/353
2011/0139710 A1 * 6/2011 Zhang .................... B04C 5/081 210/512.3
2019/0009281 A1 * 1/2019 Kraxner ................... B04C 5/04
2023/0001432 A1 * 1/2023 Maduta .................... B04C 9/00

FOREIGN PATENT DOCUMENTS

CN 112013578 A 12/2020
CN 215822556 U 2/2022
EP 0728435 A1 * 8/1996 ............ B04C 5/187

* cited by examiner

FIG. 8

GAS-LIQUID SEPARATION DEVICE

CROSS-REFERENCE TO RELATED APPLICATION

This application claims priority, under 35 U.S.C. § 119(a), to Korean Patent Application No. 10-2022-0059924 filed on May 17, 2022, the entire contents of which are incorporated herein by reference.

TECHNICAL FIELD

The present disclosure relates to a gas-liquid separation device, and more particularly to a gas-liquid separation device for effectively separating, from a liquid, gas mixed in the liquid.

BACKGROUND

Generally, vehicles use a coolant as an intermediate medium for recovering heat generated from an engine, a battery, etc., thereby removing the recovered heat.

Although the coolant is a liquid, gas is dissolved therein or air bubbles are mixed therewith. Air bubbles included in the coolant interfere with heat exchange between a heat source and the coolant or heat exchange between the coolant and air. Furthermore, when air bubbles included in the coolant burst, an abnormal sound may be generated.

To this end, in vehicles, air bubbles are separated from the coolant through a reservoir tank or a gas-liquid separator.

In some cases, a gas-liquid separator, air bubbles are separated from the coolant through steps of introduction, separation, acceleration and collection. When the coolant including air bubbles is introduced into the gas-liquid separator, the gas-liquid separator separates air bubbles from the coolant through a separation step and a separation acceleration step, and then collects the coolant and the air bubbles in an individual manner through a collection step.

In some cases, a gas-liquid separator may have a drawback of low gas-liquid separation performance because the gas-liquid separator is configured to naturally separate the coolant and air bubbles from each other in accordance with a specific gravity difference between the coolant and the air bubbles. In addition, the conventional gas-liquid separator has a problem in that a flowing state of the air bubbles separated from the coolant may not be stably maintained and, as such, the air bubbles may be again mixed in the coolant.

In some cases, the conventional gas-liquid separator may also have a drawback in that the gas-liquid separator is mounted to an exterior of a reservoir tank as a separate structure and, as such, a spatial limitation of the reservoir tank is increased.

SUMMARY OF THE DISCLOSURE

The present disclosure describes a gas-liquid separation device configured to have a structure capable of enhancing gas-liquid separation performance.

Objects of the present disclosure are not limited to the above-described objects, and other objects of the present disclosure not yet described will be more clearly understood by those skilled in the art from the following detailed description. In addition, objects of the present disclosure may be accomplished by means defined in the appended claims and combinations thereof.

According to one aspect of the subject matter described in this application, a gas-liquid separation device includes a body configured to allow mixed fluid to be introduced into a longitudinally central portion thereof, and to have a cylindrical structure having an inner diameter gradually reduced as the body extends from the central portion to opposite ends thereof, a pair of gas discharge pipes respectively provided at the opposite ends of the body and configured to discharge, to an exterior of the body, gas separated from the mixed fluid in an interior of the body, and a pair of liquid discharge pipes respectively provided at the opposite ends of the body and configured to discharge, to the exterior of the body, the mixed fluid from which the gas has been separated.

In some implementations, the body may be provided, at an upper side of the longitudinally central portion thereof, with a fluid introduction pipe extending in a tangential direction, and may receive the mixed fluid through the fluid introduction pipe.

In some implementations, the body may include a left body part and a right body part each having a tapered cylindrical structure, and may have a structure in which a first end of the left body part having a maximum inner diameter and a first end of the right body part having a maximum inner diameter are interconnected to be integrated with each other.

In some implementations, the body may be configured to be symmetrical at left and right sides thereof with reference to the first ends of the left body part and the right body part.

In some implementations, each of the left body part and the right body part may have a second end having a minimum inner diameter, a left minimum inner diameter part having a cylindrical structure having a same inner diameter as the second end of the left body part may be provided at the second end of the left body part, and a right minimum inner diameter part having a cylindrical structure having a same inner diameter as the second end of the right body part may be provided at the second end of the right body part.

In some implementations, a first one of the pair of gas discharge pipes may be disposed within the left minimum inner diameter part, and extends toward the left body part; and a second one of the pair of gas discharge pipes may be disposed within the right minimum inner diameter part, and extends toward the right body part.

In some implementations, the first gas discharge pipe may be formed to have a cylindrical structure having an outer diameter smaller than the inner diameter of the left minimum inner diameter part, and may be disposed at a radially central portion of the left minimum inner diameter part. The second gas discharge pipe may be formed to have a cylindrical structure having an outer diameter smaller than the inner diameter of the right minimum inner diameter part, and may be disposed at a radially central portion of the right minimum inner diameter part.

In some implementations, a first one of the pair of liquid discharge pipes may be formed at one side of the left minimum inner diameter part in a circumferential direction, to protrude from the side of the left minimum inner diameter part, and a second one of the pair of liquid discharge pipes may be formed at one side of the right minimum inner diameter part in a circumferential direction, to protrude from the side of the right minimum inner diameter part.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary implementations thereof illustrated in the accompanying drawings which are given hereinbelow by way of illustration only, and thus are not limitative of the present disclosure.

FIGS. 7 to 9 are views schematically showing an example of a procedure of separating, into a liquid and gas, fluid introduced into the gas-liquid separation device.

Figure 1:
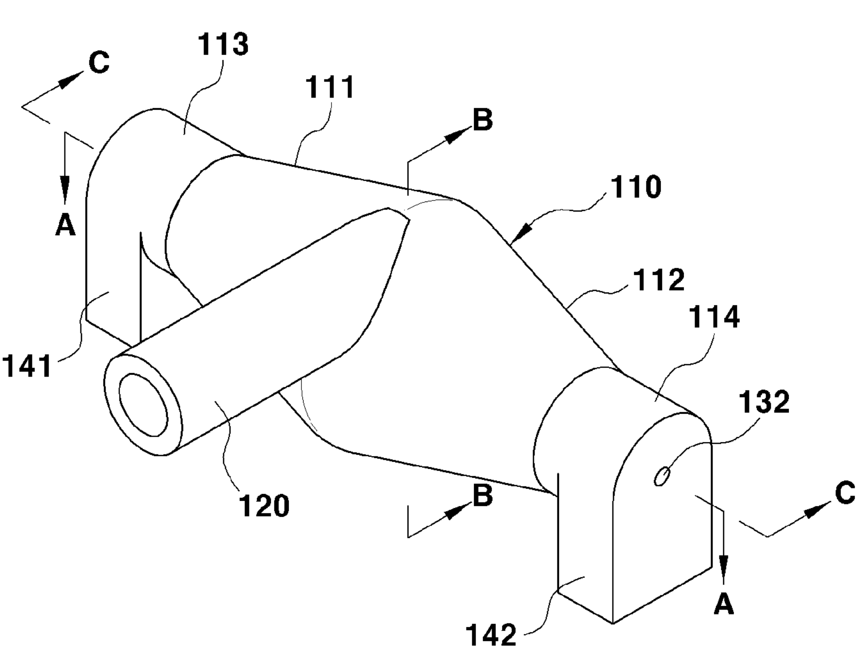
FIG. 1 is a perspective view showing an example of a gas-liquid separation device.

In the figures, reference numbers refer to the same or equivalent parts of the present disclosure throughout the several figures of the drawing.

DETAILED DESCRIPTION

The present disclosure describes one or more implementations. The specific structural or functional descriptions are exemplary to merely describe the implementations of the present disclosure, and the implementations of the present disclosure can be implemented in various forms and should not be interpreted as being limited to the implementations described in the present specification.

The present disclosure relates to a gas-liquid separation device configured to effectively separate, from a liquid, gas mixed in the liquid, and provides a gas-liquid separation device having enhanced gas-liquid separation performance.

In the present disclosure, a liquid mixed with gas or a liquid mixed with air bubbles will be referred to as a "fluid" or a "mixed fluid."

Figure 2:
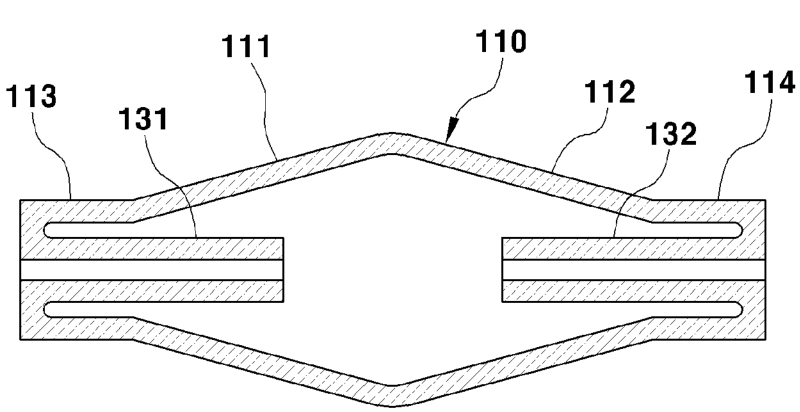
FIG. 2 is a cross-sectional view taken along line A-A in FIG. 1.
Figure 3:
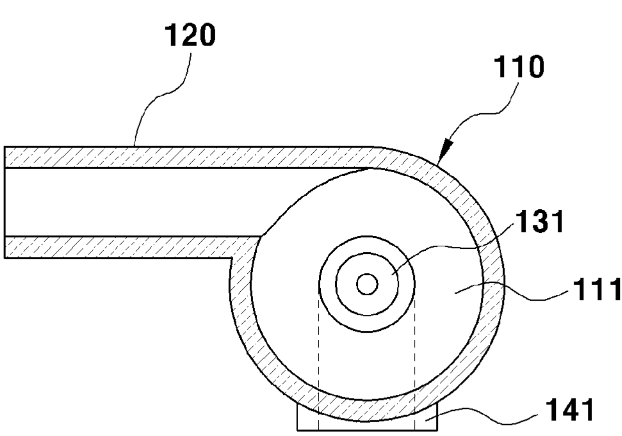
FIG. 3 is a cross-sectional view taken along line B-B in FIG. 1.
Figure 4:
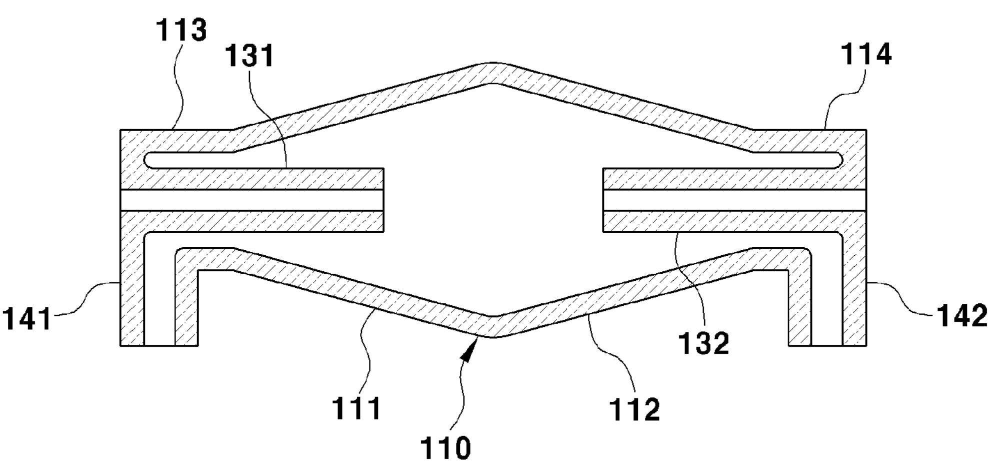
FIG. 4 is a cross-sectional view taken along line C-C in FIG. 1.
Figure 5:
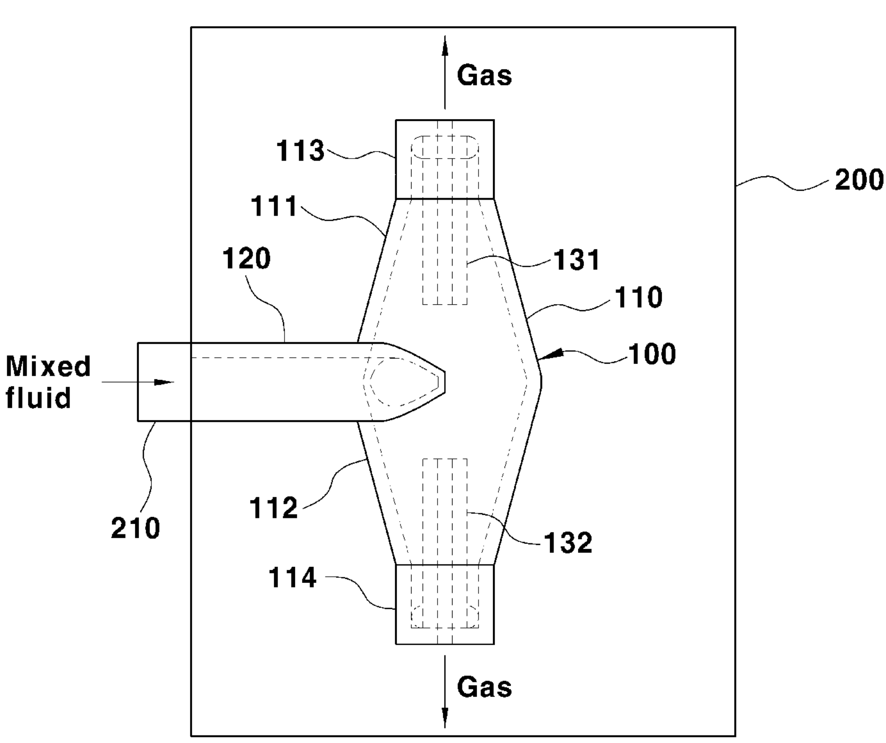
FIG. 5 is a sectional view showing an example of a liquid storage tank, in which the gas-liquid separation device is installed, viewed at the top side thereof.
Figure 6:
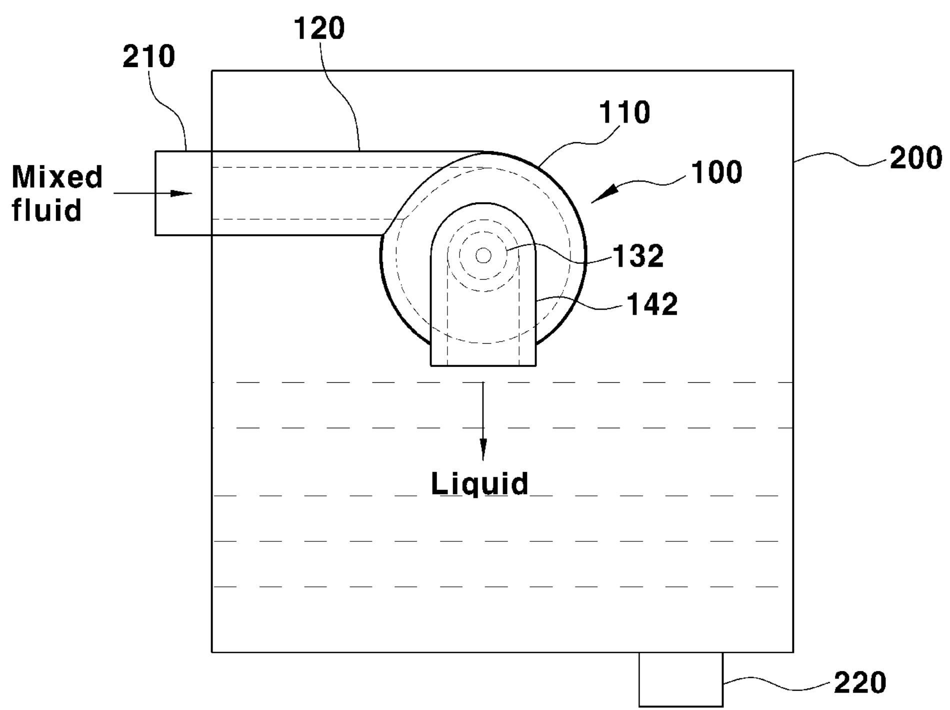
FIG. 6 is a sectional view of the liquid storage tank, in which the gas-liquid separation device is installed, viewed at the lateral side thereof.
Figure 7:
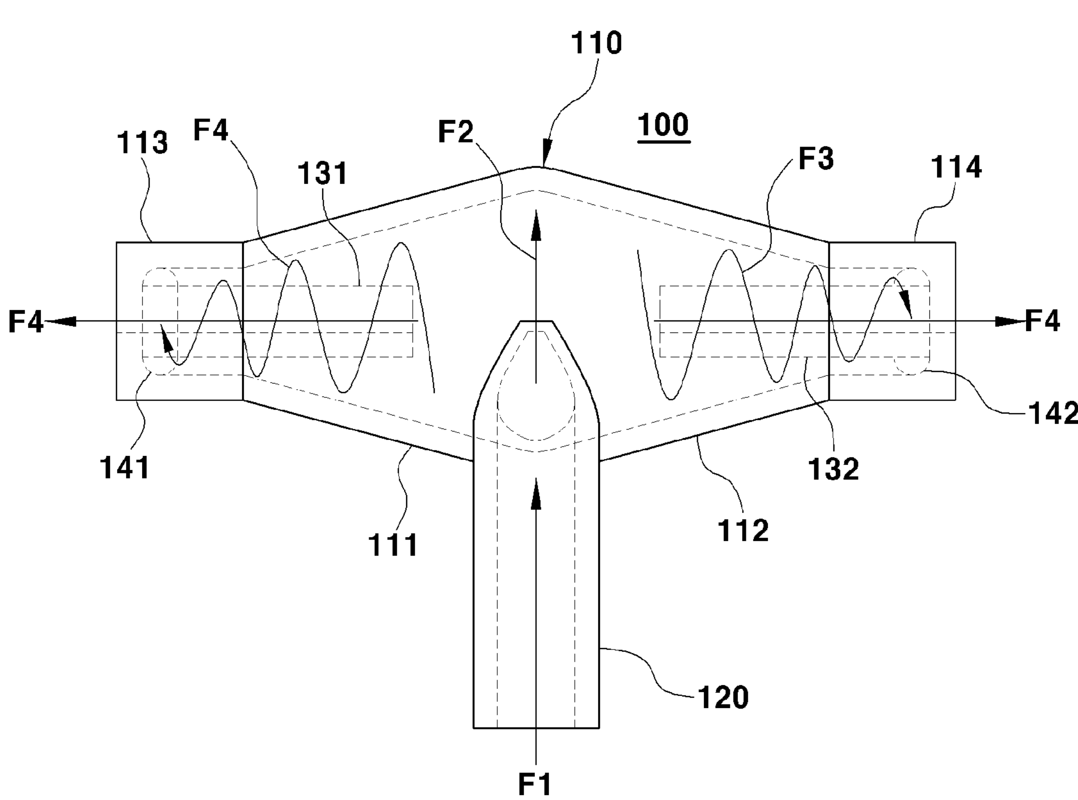
Figure 8:
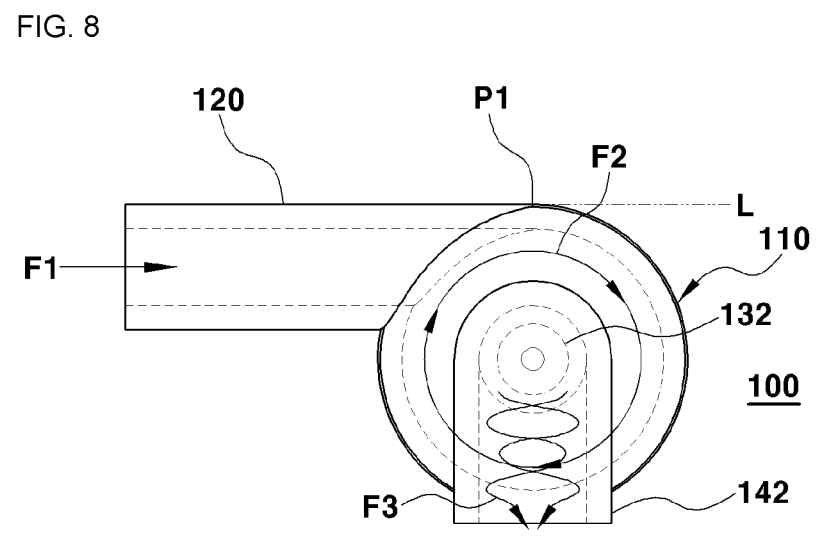
Figure 9:
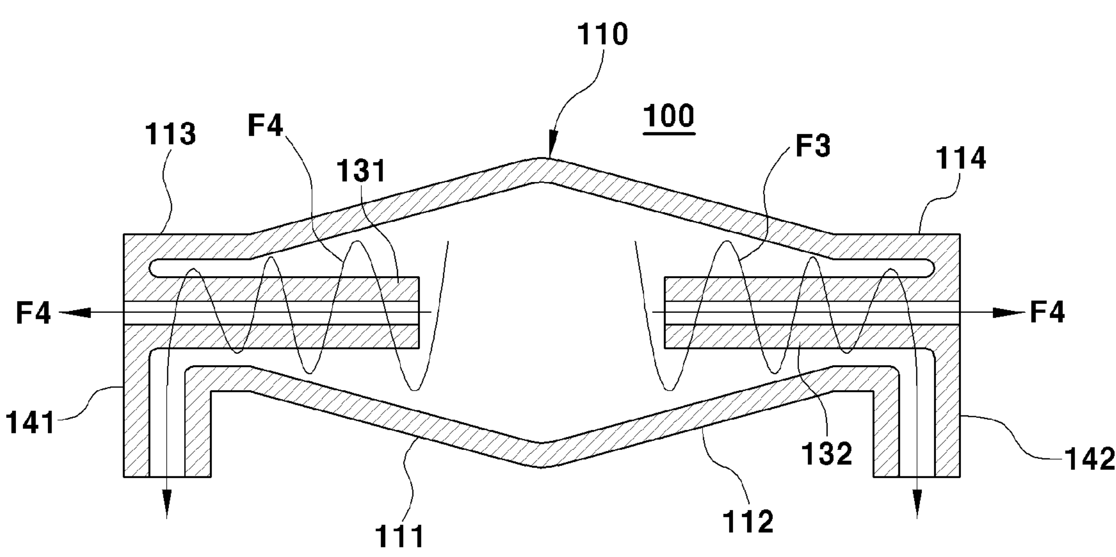

FIG. 1 is a perspective view showing an example of a gas-liquid separation device. FIG. 2 is a cross-sectional view taken along line A-A in FIG. 1. FIG. 3 is a cross-sectional view taken along line B-B in FIG. 1. FIG. 4 is a cross-sectional view taken along line C-C in FIG. 1. FIG. 5 is a sectional view of a liquid storage tank, in which the gas-liquid separation device is installed, viewed at the top side thereof. FIG. 6 is a sectional view of the liquid storage tank, in which the gas-liquid separation device is installed, viewed at the lateral side thereof. FIGS. 7 to 9 are views schematically showing a procedure of separating, into a liquid and gas, fluid introduced into the gas-liquid separation device.

As shown in FIGS. 5 and 6, the gas-liquid separation device, which is designated by reference numeral "100," may be mounted in an inner space of a liquid storage tank 200. The inner space includes a liquid receiving space.

A liquid fills only a lower portion of the inner space of the liquid storage tank 200. The lower space is the liquid receiving space. The liquid storage tank 200 includes an inlet 210 for introduction of the liquid and an outlet 220 for discharge of the liquid. The inlet 210 is provided at an upper portion of the liquid storage tank 200, and the outlet 220 is provided at a lower portion of the liquid storage tank 200. The gas-liquid separation device 100 may be disposed in an upper portion of the inner space of the liquid storage tank 200. The upper space is a gas receiving space.

For example, the liquid storage tank 200 may be a coolant storage tank configured to store a coolant or a coolant manifold configured to distribute a coolant. The coolant may be used as an intermediate medium for recovering heat generated from an engine, a battery, etc. of a vehicle. The coolant is a liquid, but may include gas such as air dissolved therein or may be mixed with air bubbles.

When the gas-liquid separation device 100 is mounted within the liquid storage tank 200, a spatial limitation of the liquid storage tank 200 may be minimized. However, the present disclosure is not limited to such a configuration. For example, the gas-liquid separation device 100 may also be mounted to an exterior of the liquid storage tank 200.

As shown in FIGS. 1 to 4, the gas-liquid separation device 100 may be configured to include a body 110, a fluid introduction pipe 120, a pair of gas discharge pipes 131 and 132, and a pair of liquid discharge pipes 141 and 142.

The body 110 is a body of the gas-liquid separation device 100, that is, a gas-liquid separation body 110. The body 110 has an inner space capable of receiving mixed fluid and allowing the received mixed fluid to flow therein. The body 110 may be formed to have a hollow cylindrical structure having the inner space.

In detail, the body 110 is configured to have a cylindrical structure having an inner diameter gradually reduced as the body 110 extends from a central portion thereof toward opposite ends thereof. That is, the body 110 has a tapered cylindrical structure at each of a left part of the body 110 (that is, a left body part) and a right part of the body (that is, a right body part) with reference to the central portion of the body 110. The central portion is a longitudinally central portion of the body 110.

Thus, the body 110 is configured to include a left body part 111 and a right body part 112 each having a tapered cylindrical structure. Each of the left body part 111 and the right body part 112 has an inner space having a tapered cylindrical structure. Each of the left body part 111 and the right body part 112 may be formed to have a cylindrical structure tapered at a predetermined angle.

Here, the left body part 111 may also be referred to as a first body part, and the right body part 112 may also be referred to as a second body part.

Since the left body part 111 is configured to have a tapered cylindrical structure, the left body part 111 is provided with a first end having a maximum inner diameter and a second end having a minimum inner diameter. Similarly, since the right body part 112 is configured to have a tapered cylindrical structure, the right body part 112 is provided with a first end having a maximum inner diameter and a second end having a minimum inner diameter. Each first end is a portion of the body 110 having a greatest outer diameter and a greatest inner diameter, and each second end is a portion of the body 110 having a smallest outer diameter and a smallest inner diameter.

The body 110 is formed to have a structure in which the first end of the left body part 111 and the first end of the right body part 112 are interconnected to be integrated. The first end of the left body part 111 and the first end of the right body part 112 have the same outer diameter and the same inner diameter.

In addition, the body 110 is configured to include a left minimum inner diameter part 113 and a right minimum inner diameter part 114. Each of the left minimum inner diameter part 113 and the right minimum inner diameter part 114 is configured to have a hollow cylindrical structure. Each of the left minimum inner diameter part 113 and the right minimum inner diameter part 114 is configured to have an untapered cylindrical structure. That is, each of the left minimum inner diameter part 113 and the right minimum inner diameter part 114 is configured to have a cylindrical structure in which an upper semicircular portion thereof and a lower semicircular portion thereof have the same radius. Each of the left minimum inner diameter part 113 and the right minimum inner diameter part 114 has a space which is a minimum inner diameter portion of the inner space of the body 110.

Here, the left minimum inner diameter part 113 may also be referred to as a first minimum inner diameter part, and the right minimum inner diameter part 114 may also be referred to as a second minimum inner diameter part.

The left minimum inner diameter part 113 is provided at the second end of the left body part 111, to be integrated therewith. The left minimum inner diameter part 113 has the same outer diameter and the same inner diameter as the second end of the left body part 111. Similarly, the right minimum inner diameter part 114 is provided at the second end of the right body part 112, to be integrated therewith. The right minimum inner diameter part 114 has the same outer diameter and the same inner diameter as the second end of the right body part 112. The left minimum inner diameter part 113 is formed to extend from the second end of the left body part 111, and the right minimum inner diameter part 114 is formed to extend from the second end of the right body part 112.

As shown in FIGS. 2 and 4, the body 110 is configured to be symmetrical at left and right sides thereof with reference to the first ends of the left body part 111 and the right body part 112. That is, a left part of the body 110 and a right part of the body 110 are symmetrical with each other with reference to the first ends.

For this structure, the left body part 111 and the right body part 112 are formed to be symmetrical with each other with reference to the first ends, and the left minimum inner diameter part 113 and the right minimum inner diameter part 114 are also formed to be symmetrical with each other with reference to the first ends. In addition, the pair of gas discharge pipes 131 and 132 is configured to be symmetrical with each other with reference to the first ends, and the pair of liquid discharge pipes 141 and 142 is also configured to be symmetrical with each other with reference to the first ends.

As shown in FIGS. 7 and 8, the body 110 is configured such that mixed fluid F1 is introduced into the central portion of the body 110 in a tangential direction. In detail, the body 110 is configured such that the mixed fluid F1 is introduced into the body 110 in a direction parallel to a line L tangent to the central portion of the body 110. In other words, the mixed fluid F1 is supplied to the central portion of the body 110 in a direction parallel to the tangent line L to the central portion of the body 110. The mixed fluid F1 may be supplied to the central portion of the body 110 at a predetermined flow rate. The tangent line L is a tangent line contacting one point P1 of the longitudinally central portion of the body 110.

In some implementations, the body 110 is provided with the fluid introduction pipe 120 which extends in a tangential direction of the body 110. An upper end of the fluid introduction pipe 120 is connected to the point P1. The fluid introduction pipe 120 is provided at an upper side of the longitudinally central portion of the body 110, to be integrated therewith, and extends in a direction parallel to the tangent line L. The mixed fluid F1 is introduced into the longitudinally central portion of the body 110 through the fluid introduction pipe 120. The fluid introduction pipe 120 does not extend in a radial direction of the body 110.

In addition, the fluid introduction pipe 120 is disposed such that a radial center thereof is aligned with the first ends of the left body part 111 and the right body part 112.

When the gas-liquid separation device 100 is installed in the liquid storage tank 200, the fluid introduction pipe 120 is connected to the inlet 210 of the liquid storage tank 200 to enable flow of fluid therebetween, and the body 110 is configured to be fixed to an interior of the liquid storage tank 200.

The fluid introduction pipe 120 may be directly connected to the inlet 210 of the liquid storage tank 200. The fluid introduction pipe 120 may be formed to have the same radius as the inlet 210. The fluid introduction pipe 120 may be disposed to be coaxial with the inlet 210. In addition, the body 110 may be disposed in an upper portion of the inner space of the liquid storage tank 200.

The pair of gas discharge pipes 131 and 132 is provided at opposite ends of the body 110, respectively, and is configured to discharge gas separated from the mixed fluid F1 in the interior of the body 110 to an exterior of the body 110.

A first one of the pair of gas discharge pipes 131 and 132, for example, the gas discharge pipe 131, is disposed within the left minimum inner diameter part 113, and extends toward the left body part 111. A second one of the pair of gas discharge pipes 131 and 132, for example, the gas discharge pipe 132, is disposed within the right minimum inner diameter part 114, and extends toward the right body part 112.

The first gas discharge pipe 131 is formed to have a cylindrical structure having an outer diameter smaller than the inner diameter of the left minimum inner diameter part 113. The second gas discharge pipe 132 is formed to have a cylindrical structure having an outer diameter smaller than the inner diameter of the right minimum inner diameter part 114.

In some implementations, the first gas discharge pipe 131 is disposed at a radially central portion of the left minimum inner diameter part 113 while defining a predetermined gap together with the left minimum inner diameter part 113. The second gas discharge pipe 132 is disposed at a radially central portion of the right minimum inner diameter part 114 while defining a predetermined gap together with the right minimum inner diameter part 114. That is, the predetermined gaps are formed between respective outer circumferential surfaces of the gas discharge pipes 131 and 132 and respective inner circumferential surfaces of the minimum inner diameter parts 113 and 114.

In addition, the first gas discharge pipe 131 and the second gas discharge pipe 132 extend linearly, and a first end of the first gas discharge pipe 131 and a first end of the second gas discharge pipe 132 are disposed to be spaced apart from each other by a predetermined distance while facing each other.

In some implementations, a second end of the first gas discharge pipe 131 may be formed at an end of the left minimum inner diameter part 113, to be integrated therewith, and a second end of the second gas discharge pipe 132 may be formed at an end of the right minimum inner diameter part 114, to be integrated therewith. The first gas discharge pipe 131 may extend from the end of the left minimum inner diameter part 113 toward the left body part 111, and the second gas discharge pipe 132 may extend from the end of the right minimum inner diameter part 114 toward the right body part 112.

In some implementations, a first end of the left minimum inner diameter part 113 is directly connected to the second end of the left body part 111, and a second end of the left minimum inner diameter part 113 is directly connected to the second end of the first gas discharge pipe 131. In some implementations, the second end of the left minimum inner diameter part 113 may extend toward the second end of the first gas discharge pipe 131, or the second end of the first gas discharge pipe 131 may extend toward the second end of the left minimum inner diameter part 113. Such a connection structure of the left minimum inner diameter part 113, the left body part 111 and the first gas discharge pipe 131 is also applied to the right minimum inner diameter part 114, the right body part 112 and the second gas discharge pipe 132 in the same manner.

In some implementations, the pair of liquid discharge pipes 141 and 142 is provided at opposite ends of the body 110, respectively, and is configured to discharge mixed fluid, from which gas has been removed through separation in the interior of the body 110, that is, a liquid, to an exterior of the body 110.

A first one of the pair of liquid discharge pipes 141 and 142, for example, the liquid discharge pipe 141, is formed to protrude from one side of the left minimum inner diameter part 113. A second one of the pair of liquid discharge pipes 141 and 142, for example, the liquid discharge pipe 142, is formed to protrude from one side of the right minimum inner diameter part 114. In detail, the first liquid discharge pipe 141 is formed at a one side of the left minimum inner diameter part 113 in a circumferential direction, to extend in a radial direction of the left minimum inner diameter part 113. The second liquid discharge pipe 142 is formed at a one side of the right minimum inner diameter part 114 in a circumferential direction, to extend in a radial direction of the right minimum inner diameter part 114.

In some implementations, the liquid discharge pipes 141 and 142 may be disposed at corresponding sides of the minimum inner diameter part 113 and 114 in the circumferential direction such that the liquid discharge pipes 141 and 142 form a right angle together with the gas discharge pipes 131 and 132, respectively.

In some examples, referring to FIG. 6, when the gas-liquid separation device 100 is mounted in the liquid storage tank 200, the liquid discharge pipes 141 and 142 may be disposed in the direction of gravity in order to achieve smooth liquid discharge. For example, the liquid discharge pipes 141 and 142 may be disposed in the same direction as the outlet 220 of the liquid storage tank 200.

In some examples, the liquid discharge pipes 141 and 142 are formed at the minimum inner diameter parts 113 and 114, to protrude outwardly of the minimum inner diameter parts 113 and 114, respectively, and, as such, may be disposed to be spaced apart from respective outer circumferential surfaces of the gas discharge pipes 131 and 132.

In some implementations, in FIGS. 7 to 9, "F1" represents a flow of mixed fluid supplied to the fluid introduction pipe 120, "F2" represents rotation of the mixed fluid introduced into the central portion of the body 110, "F3" represents flows of liquid flowing spirally along respective inner circumferential surfaces of the left body part 111 and the right body part 112, and "F4" represents flows of gas discharged through respective gas discharge pipes 131 and 132.

As shown in FIGS. 7 to 9, mixed fluid supplied to the central portion of the body 110 through the fluid introduction pipe 120 at a predetermined flow rate is supplied in a direction of the tangent line L to the central portion of the body 110 and, as such, rotates along an inner circumferential surface of the central portion of the body 110.

Since the left body part 111 and the right body part 112 of the body 110 are configured to have a tapered cylindrical structure, rotation force of the mixed fluid generated at the central portion of the body 110 is also smoothly generated and maintained at the left body part 111 and the right body part 112.

In some implementations, a liquid of the mixed fluid, which is a fluid portion having a relatively high density, is brought into close contact with the inner circumferential surface of the body 110 in accordance with exertion of centrifugal force, and is then distributed from the central portion of the body 110 to opposite sides of the body 110 and, as such, flows spirally along the inner circumferential surface of the body 110. In detail, a part of the liquid moves toward the second end of the left body part 111 while flowing spirally along the inner circumferential surface of the left body part 111, and the remaining part of the liquid moves toward the second end of the right body part 112 while flowing spirally along the inner circumferential surface of the right body part 112.

In addition, since the body 110 is configured to have a symmetrical structure at left and right sides thereof, rotation force of the liquid flowing toward the left body part 111 and rotation force of the liquid flowing toward the right body part 112 are equally generated.

In addition, gas of the mixed fluid, which is a fluid portion having a relatively low density, remains at the radially central portion of the body 110 without moving toward the inner circumferential surface of the body 110 because centrifugal force is hardly exerted on the gas. Accordingly, the liquid and gas of the mixed fluid are smoothly separated from each other in the body 110.

In addition, the liquid introduced into the liquid discharge pipes 141 and 142 is discharged into the lower space of the liquid storage tank 200 (cf. FIG. 6), whereas the gas introduced into the gas discharge pipe 131 and 132 is discharged into the upper space of the liquid storage tank 200 (cf. FIG. 5). For these flows, when the body 110 is disposed in the inner space of the liquid storage tank 200, the liquid discharge pipes 141 and 142 are vertically disposed to be directed to the lower portion of the inner space of the liquid storage tank 200, and the gas discharge pipes 131 and 132 are horizontally disposed to be directed to the upper portion of the inner space of the liquid storage tank 200.

In some implementations, the gas in the mixed fluid is mainly mixed with the liquid in the form of air bubbles. The air bubbles in the mixed fluid are not only separated from the liquid at the central portion of the body 110, but also are gathered. In other words, the air bubbles in the mixed fluid are separated from the liquid by rotation force of the mixed fluid generated at the central portion of the body 110, and are gathered and merged. As a result, the size of the resultant air bubbles is increased. The relatively enlarged air bubbles may have a greater diameter than the gap between the minimum inner diameter parts 113 and 114 and the gas discharge pipes 131 and 132 and, as such, possibility that the air bubbles are again mixed with the liquid is eliminated. As the size of the air bubbles increases, the possibility that the air bubbles are again mixed with the liquid is reduced.

In addition, since the liquid discharge pipes 141 and 142 are disposed to be spatially completely separated from the gas discharge pipes 131 and 132, it may be possible to prevent gas from being again mixed with the liquid before being introduced into the gas discharge pipes 131 and 132.

In detail, since the gas discharge pipes 131 and 132 are disposed to define predetermined gaps together with the minimum inner diameter parts 113 and 114, respectively, and the liquid discharge pipes 141 and 142 are formed to protrude outwardly of the minimum inner diameter parts 113 and 114, respectively, it may be possible to prevent the gas from being again mixed with the liquid flowing toward the liquid discharge pipes 141 and 142.

In addition, the gas discharge pipes 131 and 132 are disposed to extend to central portions of the left body part 111 and the right body part 112, respectively, and, as such, are advantageous in preventing gas separated from the liquid of the mixed fluid from being again mixed with the liquid.

As apparent from the above description, the gas-liquid separation device provides the following effects.

In the gas-liquid separation device, gas-liquid separation performance is greatly enhanced because the body of the gas-liquid separation device is configured to have a cylindrical structure tapered in left and right directions, and mixed fluid is supplied to the central portion of the body in a tangential direction. Accordingly, when the gas-liquid separation device is applied to a coolant storage tank of a vehicle, it may be possible to enhance both cooling performance of a coolant for a heating source and heat radiation performance for ambient air. As a result, enhanced fuel economy of the vehicle and prevention of generation of an abnormal sound may be expected.

Effects attainable in the present disclosure are not limited to the above-described effects, and other effects of the present disclosure not yet described will be more clearly understood by those skilled in the art from the appended claims.

The disclosure has been described in detail with reference to exemplary implementations thereof. However, it will be appreciated by those skilled in the art that changes may be made in these implementations without departing from the principles and spirit of the disclosure, the scope of which is defined in the appended claims and their equivalents.

What is claimed is:

1. A gas-liquid separation device comprising:

a body that has a cylindrical structure and defines a central portion configured to receive mixed fluid, the body defining an inner diameter decreasing as the body extends longitudinally outward along a central axis of the body from the central portion to minimum inner diameter parts disposed at opposite ends of the body;

a pair of gas discharge pipes respectively disposed at the opposite ends of the body and configured to discharge, to an exterior of the body, gas separated from the mixed fluid in an interior of the body; and a pair of liquid discharge pipes respectively disposed at the opposite ends of the body and configured to discharge liquid to the exterior of the body based on the gas having been separated the mixed fluid, wherein a respective gas discharge pipe of the pair of gas discharge pipes has (i) a first end defining a predetermined gap between an outer circumferential surface of the respective gas discharge pipe and an inner circumferential surface of a corresponding one of the minimum inner diameter parts and (ii) a second end that extends from the first end and defines only one opening at the central portion of the body, wherein each of the pair of liquid discharge pipes protrudes outward from the corresponding one of the minimum inner diameter parts to thereby prevent the gas separated from the mixed fluid from being mixed with the liquid flowing toward a respective liquid discharge pipe of the pair of liquid discharge pipes, wherein the minimum inner diameter parts and the respective gas discharge pipe extend parallel to the central axis such that a width of the predetermined gap is maintained from the first end of the respective gas discharge pipe to an inner end of each of the minimum inner diameter parts, and wherein the predetermined gap is connected to the interior of the body and configured to communicate at least a portion of the mixed fluid with the interior of the body.

2. The gas-liquid separation device according to claim 1, further comprising a fluid introduction pipe that is disposed at an upper side of the central portion of the body and configured to guide the mixed fluid to the central portion, the fluid introduction pipe extending in a tangential direction from the upper side of the central portion.

3. The gas-liquid separation device according to claim 1, wherein the body comprises a first body part and a second body part each having a tapered cylindrical structure, wherein a first end of the first body part defines a maximum inner diameter of the first body part, and a first end of the second body part defines a maximum inner diameter of the second body part, and wherein the first end of the first body part and the first end of the second body part are connected to each other.

4. The gas-liquid separation device according to claim 3, wherein the body is symmetrical with reference to an axis extending along the first ends of the first body part and the second body part.

5. The gas-liquid separation device according to claim 3, wherein each of the first body part and the second body part has a second end that defines a minimum inner diameter thereof, and wherein the minimum inner diameter parts include:

a first minimum inner diameter part that is disposed at the second end of the first body part and has a cylindrical structure having the minimum inner diameter of the first body part; and a second minimum inner diameter part that is disposed at the second end of the second body part and has a cylindrical structure having the minimum inner diameter of the second body part.

6. The gas-liquid separation device according to claim 5, wherein the pair of gas discharge pipes comprise:

a first gas discharge pipe that is disposed within the first minimum inner diameter part and extends toward the first body part; and a second gas discharge pipe that is disposed within the second minimum inner diameter part and extends toward the second body part.

7. The gas-liquid separation device according to claim 6, wherein:

the first gas discharge pipe has a cylindrical structure having a first outer diameter smaller than the minimum inner diameter of the first minimum inner diameter part, the first gas discharge pipe being disposed at a radial center portion of the first minimum inner diameter part; and the second gas discharge pipe has a cylindrical structure having a second outer diameter smaller than the minimum inner diameter of the second minimum inner diameter part, the second gas discharge pipe being disposed at a radial center portion of the second minimum inner diameter part.

8. The gas-liquid separation device according to claim 5, wherein the pair of liquid discharge pipes comprise:

a first liquid discharge pipe that protrudes from an outer circumferential surface of the first minimum inner diameter part; and a second liquid discharge pipe that protrudes from an outer circumferential surface of the second minimum inner diameter part.

9. The gas-liquid separation device according to claim 1, wherein the pair of gas discharge pipes are disposed in the interior of the body, and wherein the pair of liquid discharge pipes are disposed at the exterior of the body.

10. The gas-liquid separation device according to claim 9, wherein each of the pair of gas discharge pipes has an inner hole facing the interior of the body and an outer hole facing the exterior of the body.

11. The gas-liquid separation device according to claim 1, wherein the gas-liquid separation device is configured to be accommodated in a liquid storage tank.

12. The gas-liquid separation device according to claim 11, further comprising a fluid introduction pipe that is connected to an inlet of the liquid storage tank.

13. The gas-liquid separation device according to claim 11, wherein the pair of gas discharge pipes are disposed in the interior of the body, and wherein the pair of liquid discharge pipes are disposed at the exterior of the body and configured to be disposed inside the liquid storage tank.

14. The gas-liquid separation device according to claim 5, wherein the maximum inner diameter of the first body part is equal to the maximum inner diameter of the second body part, and wherein the minimum inner diameter of the first body part is equal to the minimum inner diameter of the second body part.

15. A gas-liquid separation device comprising:

a body that has a cylindrical structure and defines a central portion configured to receive mixed fluid, the body defining an inner diameter decreasing as the body extends longitudinally outward along a central axis of the body from the central portion to opposite ends of the body, wherein the body has minimum inner diameter parts at the opposite ends thereof;

a pair of gas discharge pipes respectively disposed at the opposite ends of the body and configured to discharge, to an exterior of the body, gas separated from the mixed fluid in an interior of the body; and a pair of liquid discharge pipes respectively disposed at the opposite ends of the body and configured to discharge liquid to the exterior of the body based on the gas having been separated the mixed fluid, wherein the pair of liquid discharge pipes are disposed at circumferential sides of the minimum inner diameter parts of the body, respectively, each of the pair of liquid discharge pipes defining a predetermined angle with respect to a corresponding one of the pair of gas discharge pipes, wherein a respective gas discharge pipe of the pair of gas discharge pipes has (i) a first end defining a predetermined gap between an outer circumferential surface of the respective gas discharge pipe and an inner circumferential surface of a corresponding one of the minimum inner diameter parts and (ii) a second end that extends from the first end and defines only one opening at the central portion of the body, wherein each of the pair of liquid discharge pipes protrudes outward from the corresponding one of the minimum inner diameter parts to thereby prevent the gas separated from the mixed fluid from being mixed with the liquid flowing toward a respective liquid discharge pipe of the pair of liquid discharge pipes, wherein the minimum inner diameter parts and the respective gas discharge pipe extend parallel to the central axis such that a width of the predetermined gap is maintained from the first end of the respective gas discharge pipe to an inner end of each of the minimum inner diameter parts, and wherein the predetermined gap is connected to the interior of the body and configured to communicate at least a portion of the mixed fluid with the interior of the body.

* * * * *